(12) United States Patent
Kubo et al.

(10) Patent No.: US 8,339,519 B2
(45) Date of Patent: Dec. 25, 2012

(54) IMAGE PROCESSING APPARATUS AND METHOD AND IMAGE DISPLAY APPARATUS AND METHOD

(75) Inventors: Toshiaki Kubo, Tokyo (JP); Yoshiki Ono, Tokyo (JP); Naoyuki Fujiyama, Tokyo (JP); Tomoatsu Horibe, Tokyo (JP); Osamu Nasu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/236,821

(22) Filed: Sep. 20, 2011

(65) Prior Publication Data

US 2012/0099018 A1 Apr. 26, 2012

(30) Foreign Application Priority Data

Oct. 26, 2010 (JP) ................................. 2010-239956

(51) Int. Cl.
*H04N 7/01* (2006.01)

(52) U.S. Cl. ...... 348/701; 348/699; 348/620; 348/413.1; 348/452; 348/441; 382/300; 375/240.16

(58) Field of Classification Search .................. 348/699, 348/701, 620, 452, 413.1, 441; 382/236, 382/300; 375/240.01, 240.16
See application file for complete search history.

(56) References Cited

U.S. PATENT DOCUMENTS

| 5,825,429 A * | 10/1998 | Shirahata ...................... 348/448 |
| 6,804,419 B1 * | 10/2004 | Miyake ......................... 382/300 |
| 2004/0246374 A1 | 12/2004 | Mishima et al. |
| 2006/0092321 A1 | 5/2006 | Ogino et al. |

FOREIGN PATENT DOCUMENTS

| JP | 2006-129181 A | 5/2006 |
| JP | 4220284 B2 | 2/2009 |
| JP | 4244685 B2 | 3/2009 |

* cited by examiner

*Primary Examiner* — Jefferey Harold
*Assistant Examiner* — Jean W Desir
(74) *Attorney, Agent, or Firm* — Birch, Stewart, Kolasch & Birch, LLP

(57) ABSTRACT

An image processing apparatus, in which an interpolation frame is inserted between a current frame and a first delayed frame preceding the current frame by one frame, includes a motion vector detector, a motion vector converter, and an interpolation frame generator; wherein the motion vector detector includes a test interpolator outputting test interpolation data, an interpolation data evaluator evaluating a correlation of each of the test interpolation data with reference to the first-delayed-frame block data, thereby outputting evaluation data indicating results of the evaluating, and a motion vector determiner outputting a motion vector of an item of the evaluation data having highest correlation in the plurality of items of the evaluation data; and the first to third test interpolation data are obtained as the test interpolation data from a plurality of items of the second-delayed-frame block data and a plurality of items of the current-frame block data.

14 Claims, 13 Drawing Sheets

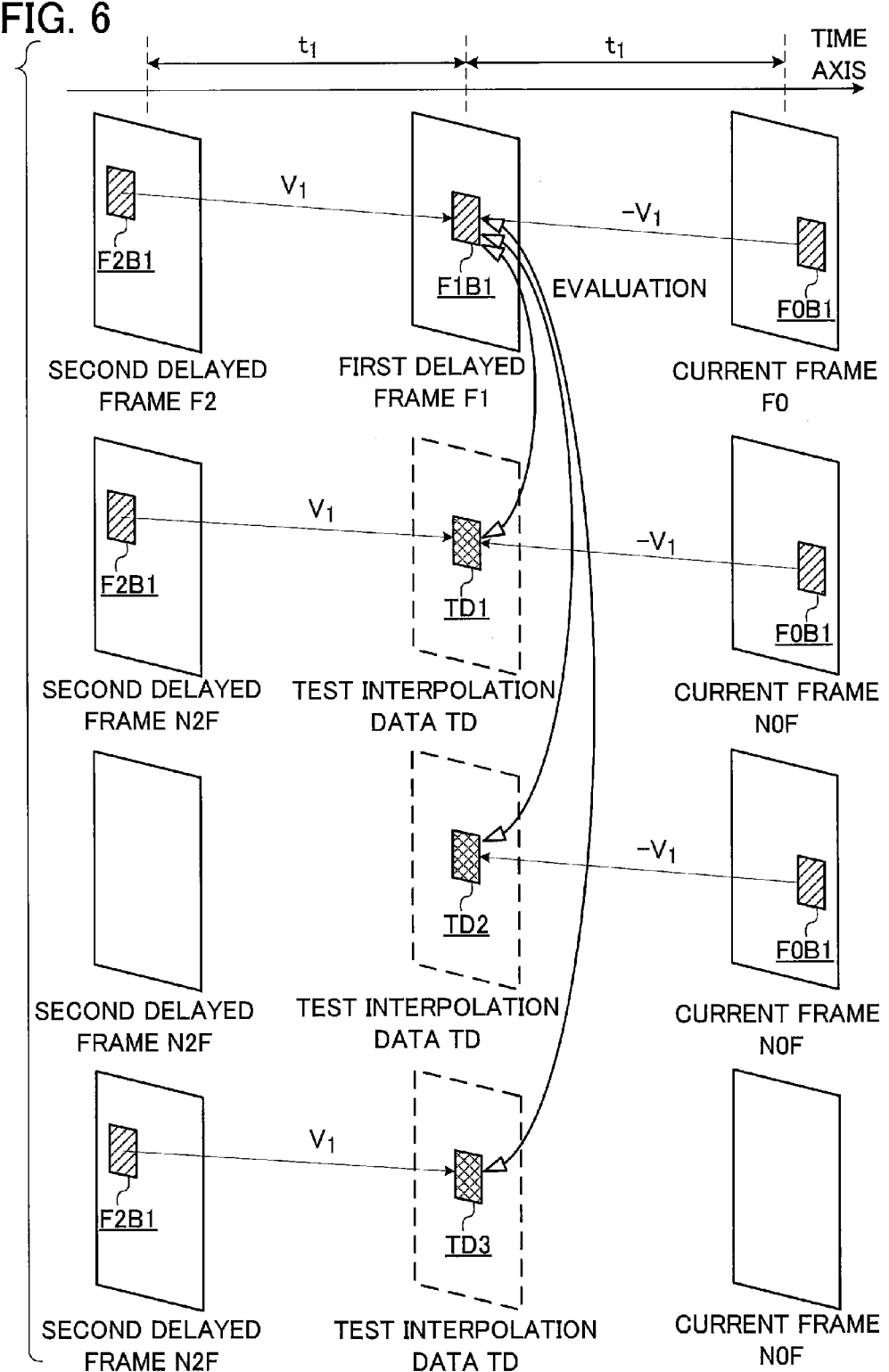

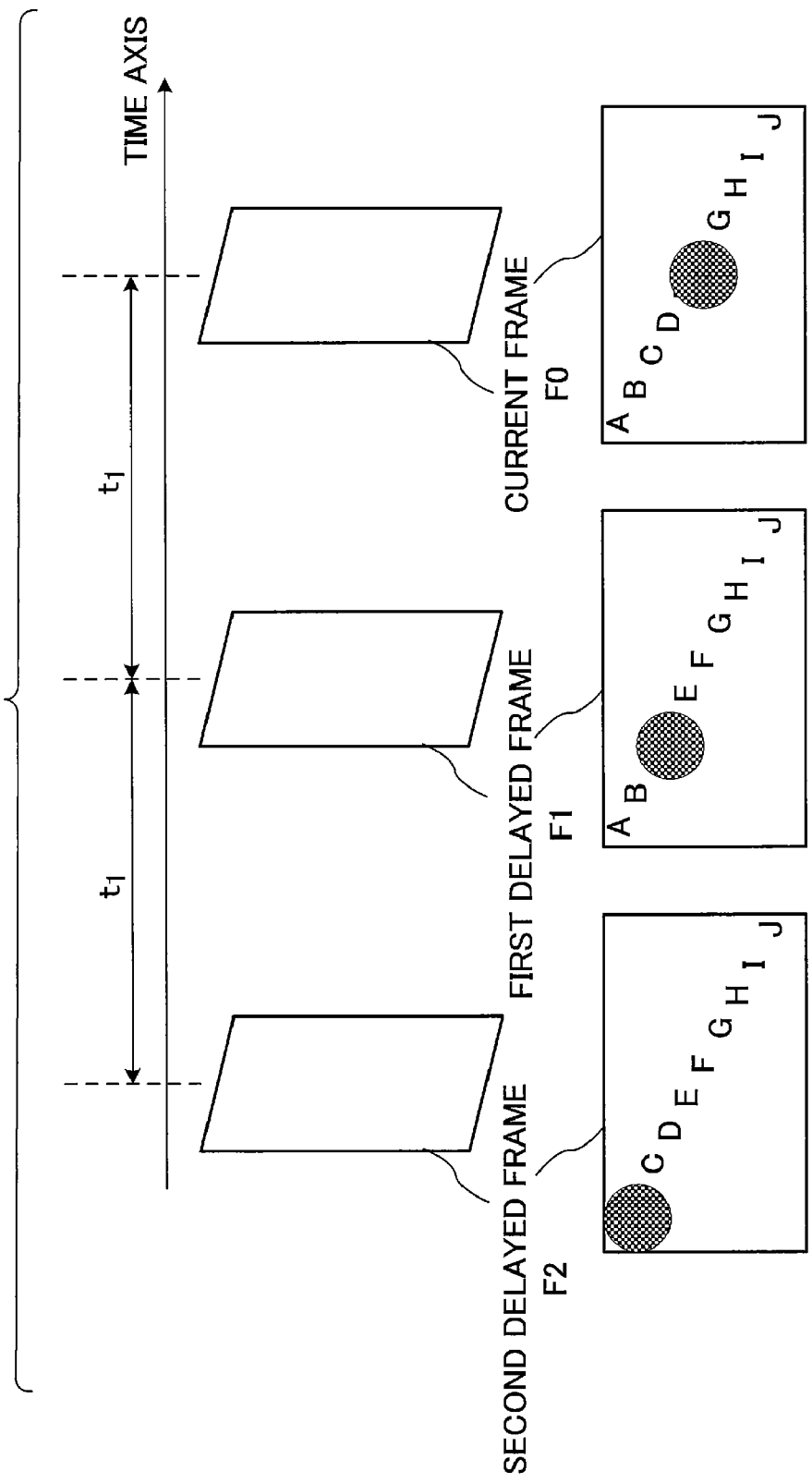

SECOND DELAYED FRAME F2 | TEST INTERPOLATION DATA TD | CURRENT FRAME F0

SECOND DELAYED FRAME F2 | TEST INTERPOLATION DATA TD | CURRENT FRAME F0

SECOND DELAYED FRAME F2 | TEST INTERPOLATION DATA TD | CURRENT FRAME F0

SECOND DELAYED FRAME F2 | TEST INTERPOLATION DATA TD | CURRENT FRAME F0

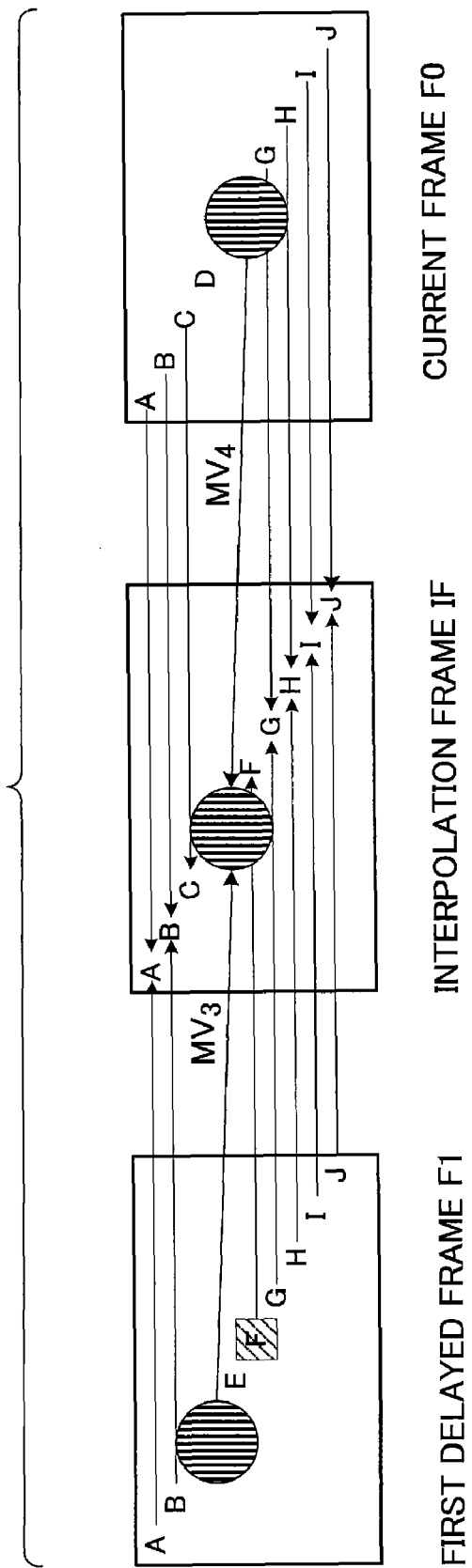

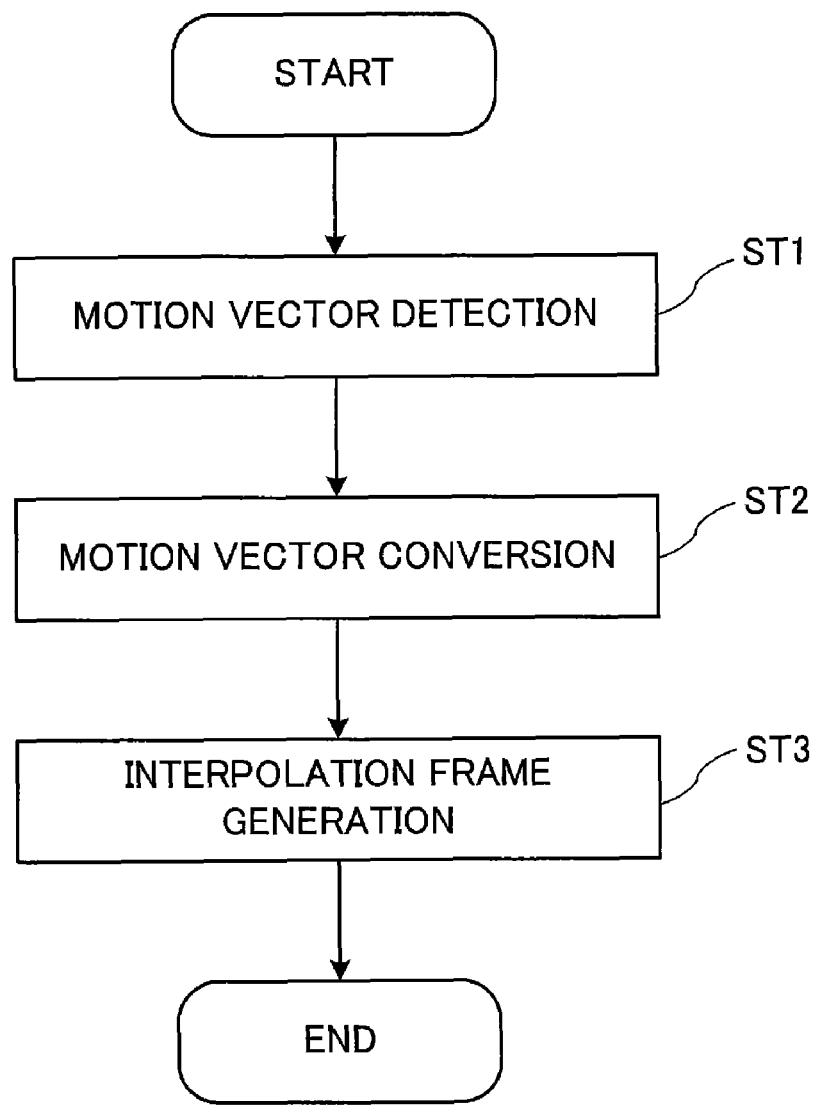

IMAGE PROCESSING APPARATUS AND METHOD AND IMAGE DISPLAY APPARATUS AND METHOD

BACKGROUND OF THE INVENTION

1. Field of the Invention

The present invention relates to an image processing apparatus and an image processing method for performing frame interpolation processing in which an interpolation frame is inserted between frames of an image, and an image display apparatus and an image display method for displaying an image based on image data that has been subjected to such frame interpolation processing.

2. Description of the Related Art

Movement of an object on a displayed image of a hold-type display such as a liquid crystal display is performed on a frame-by-frame basis and is discontinuous one, whereas following of the movement of the object by human eyes (i.e., movement of human eyes) is continuous one. For this reason, a judder phenomenon, in which an object moving on a displayed image exhibits blur or an object on a displayed image exhibits jerky movement (i.e., stiff and unnatural movement), is apt to appear in the hold-type display.

To take measures against this, a method is proposed to insert an interpolation frame between frames of an image, thereby increasing number of the frames and smoothing the movement of the object on the displayed image. It is generally known that a typical method of generating an interpolation frame is a zero-order hold method in which the interpolation frame is generated from the same image as that of a frame preceding the interpolation frame by one frame or an average-value interpolation method in which the interpolation frame is generated from an average of an image of a frame preceding the interpolation frame by one frame and another image of a frame subsequent to the interpolation frame by one frame. However, in the zero-order hold method, since the same frame is displayed repeatedly, reduction of the image blur and judder is insufficient. Furthermore, in the average-value interpolation method, since an edge of the object moving on the displayed image sometimes exhibits a double image, reduction of the image blur and judder is insufficient.

Further, a television signal converted from a film picture such as a movie is a signal in which number of frames is increased by generating two frames or three frames from the same frame, thereby making the number of frames larger than that of the film picture. In this method, since the same frame is displayed repeatedly, the image blur and judder are apt to appear on an image which is displayed on the basis of the television signal converted from the film picture. Similarly, a television signal converted from an image generated by computer processing also is an image signal in which number of frames is increased by generating two frames from the same frame. Since the same frame is displayed repeatedly also in this method, the image blur and judder are apt to appear on an image which is displayed on the basis of the television signal converted from the film picture.

Furthermore, there is a highly developed method of generating an interpolation frame, including the steps of: finding pixel pairs with a high correlation, each of which is a set of a pixel on a former frame and another pixel on a later frame, where the pixel on the former frame and the pixel on the later frame are point-symmetric with reference to an interpolation pixel on an interpolation frame; generating the interpolation pixels using a plurality of pixel pairs; and generating the interpolation frame composed of the interpolation pixels. See patent document 1, Japanese Patent Kokai Publication No. 2006-129181 (paragraph 0025, FIG. 3). However, in this method, a correlation is detected on a pixel-by-pixel basis by finding the pixel pairs with a high correlation, each of which is a set of a pixel on the former frame and another pixel on the later frame, where the pixel on the former frame and the pixel on the later frame are point-symmetric with reference to an interpolation pixel on an interpolation frame, generating the interpolation pixels using a plurality of pixel pairs, and generating the interpolation frame composed of such interpolation pixels. Therefore, even if a high correlation is detected between two frames while these have quite different images, e.g., when an object appears and/or disappears suddenly on the former frame or the later frame with reference to an inserted position of the interpolation frame, the pixel pair with a high correlation between pixels is detected. As a result, there is a possibility that some inappropriate interpolation frames are generated and thus a disturbance appears on the displayed image.

As has been described above, since the conventional image processing method cannot reduce the image blur and judder to a sufficient degree or the disturbance sometimes occurs in the interpolation frame, there is a problem that images with high quality cannot be displayed.

SUMMARY OF THE INVENTION

An object of the present invention is to provide an image processing apparatus, an image processing method, an image display apparatus and an image display method capable of reducing image blur and judder, thereby making it possible to display images with high quality.

According to an aspect of the present invention, an image processing apparatus, in which an interpolation frame is inserted between a current frame of an image and a first delayed frame preceding the current frame by one frame, includes:

a motion vector detector referring to current-frame block data forming part of the current frame and second-delayed-frame block data forming part of a second delayed frame preceding the current frame by two frames, thereby calculating a first motion vector pointing from the second delayed frame to the first delayed frame, the motion vector detector referring to the current-frame block data and first-delayed-frame block data forming part of the first delayed frame preceding the current frame by one frame, thereby calculating a second motion vector pointing from the current frame to the first delayed frame;

a motion vector converter converting the first motion vector into a third motion vector pointing from the first delayed frame to the interpolation frame, the motion vector converter converting the second motion vector into a fourth motion vector pointing from the current frame to the interpolation frame; and an interpolation frame generator generating data of the interpolation frame from the third motion vector, the fourth motion vector, data of the first delayed frame and data of the current frame, thereby outputting image data in which the data of the interpolation frame is inserted between the data of the current frame and the data of the first delayed frame;

wherein the motion vector detector includes a test interpolator outputting a plurality of items of test interpolation data which includes first test interpolation data generated using an average value of both block data of the second-delayed-frame block data and the current-frame block data, second test interpolation data generated by placing the current-frame block data at a position corresponding to a position of the first-delayed-frame block data, and third test interpolation data generated by placing the second-delayed-frame block data at, a position corresponding to the position of the first-delayed-frame block data, an interpolation data evaluator evaluating a correlation of each of the test interpolation data with reference to the first-delayed-frame block data, thereby outputting a plurality of items of evaluation data indicating results of the evaluating, and a motion vector determiner outputting a motion vector of an item of the evaluation data having highest correlation in the plurality of items of the evaluation data; and the first test interpolation data, the second test interpolation data and the third test interpolation data are obtained as the plurality of items of the test interpolation data from a plurality of items of the second-delayed-frame block data and a plurality of items of the current-frame block data.

According to another aspect of the present invention, an image display apparatus includes the above described image processing apparatus; and an image display unit for displaying an image based on the image data supplied from the interpolation frame generator.

According to yet another aspect of the present invention, the image processing method, in which an interpolation frame is inserted between a current frame of an image and a first delayed frame preceding the current frame by one frame, includes:

a motion vector detection step of referring to current-frame block data forming part of the current frame and second-delayed-frame block data forming part of a second delayed frame preceding the current frame by two frames, thereby calculating a first motion vector pointing from the second delayed frame to a first delayed frame, and referring to the current-frame block data and first-delayed-frame block data forming part of the first delayed frame preceding the current frame by one frame, thereby calculating a second motion vector pointing from the current frame to the first delayed frame;

a motion vector conversion step of converting the first motion vector into a third motion vector pointing from the first delayed frame to the interpolation frame, and converting the second motion vector into a fourth motion vector pointing from the current frame to the interpolation frame; and an interpolation frame generation step of generating data of the interpolation frame from the third motion vector, the fourth motion vector, data of the first delayed frame and data of the current frame, thereby outputting image data in which the data of the interpolation frame is inserted between the data of the current frame and the data of the first delayed frame; wherein the motion vector detection step includes a test interpolation step of outputting a plurality of items of test interpolation data which includes first test interpolation data generated using an average value of both block data of the second-delayed-frame block data and the current-frame block data, second test interpolation data generated by placing the current-frame block data at a position corresponding to a position of the first-delayed-frame block data, and third test interpolation data generated by placing the second-delayed-frame block data at a position corresponding to the position of the first-delayed-frame block data, an interpolation data evaluation step of evaluating a correlation of each of the test interpolation data with reference to the first-delayed-frame block data, thereby outputting a plurality of items of evaluation data indicating results of the evaluating, and a motion vector determination step of outputting a motion vector of an item of the evaluation data having highest correlation in the plurality of items of the evaluation data;

the first test interpolation data, the second test interpolation data and the third test interpolation data are obtained as the plurality of items of the test interpolation data from a plurality of items of the second-delayed-frame block data and a plurality of items of the current-frame block data.

According to further aspect of the present invention, an image display method includes the above-described steps in the image processing method; and a step of displaying an image based on the image data supplied in the interpolation frame generation step.

According to the present invention, the image processing apparatus, the image processing method, the image display apparatus and the image display method can insert an appropriate interpolation frame, thereby implementing a high quality displayed image with reduced image blur and judder.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is an explanatory diagram illustrating operation of the motion vector detector of FIG. 1;

FIG. 8 is an explanatory diagram illustrating an example of a correspondence of data of a second delayed frame, data of a first delayed frame and data of a current frame, which are supplied to the motion vector detector of FIG. 1;

FIG. 12 is an explanatory diagram illustrating an example of operation of the interpolation frame generator of FIG. 1; and FIG. 13 is a flowchart illustrating an image processing method and an image display method according to the embodiment of the present invention.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

《1》 Outlines of Image Processing Apparatus 100 and Image Display Apparatus 101

Figure 1:
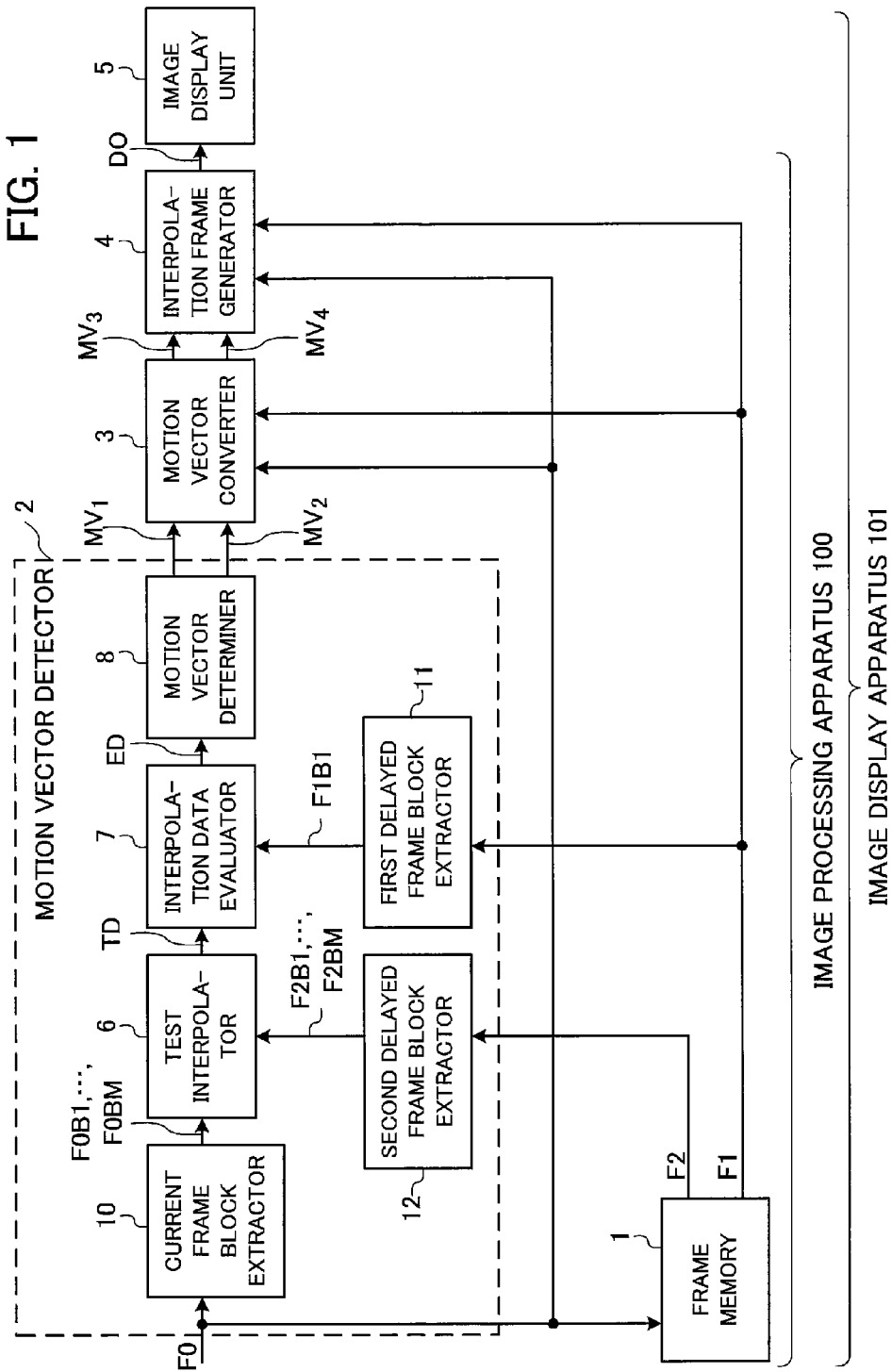
FIG. 1 is a block diagram schematically showing an example of configurations of an image processing apparatus and an image display apparatus according to an embodiment of the present invention.

FIG. 1 is a block diagram schematically showing an example of configurations of an image processing apparatus 100 and an image display apparatus 101 according to an embodiment of the present invention. The image processing apparatus 100 is an apparatus capable of implementing an image processing method according to the embodiment, and the image display apparatus 101 is an apparatus capable of implementing an image display method according to the embodiment. The image processing apparatus 100 performs processing (corresponding to processing shown in steps ST1 to ST3 in FIG. 13 to be described later) for generating an interpolation frame IF which is to be inserted between data of a current frame F0 of an image and data of a first delayed frame F1 preceding the current frame F0 by one frame, and then outputs image data DO including data of the interpolation frame IF. Furthermore, the image display apparatus 101 displays an image based on the image data DO supplied from the image processing apparatus 100.

As shown in FIG. 1, the image processing apparatus 100 includes a frame memory 1, a motion vector detector 2, a motion vector converter 3 and an interpolation frame generator 4. The image display apparatus 101 includes the image processing apparatus 100 and an image display unit 5. The image processing apparatus 100 can form part of a broadcast receiver, a video recorder/player, a personal computer (PC) or the like, for example. Furthermore, the image display apparatus 101 can form part of a television, a video projector, a PC or the like, for example.

Referring to FIG. 1, image data is sequentially input to the image processing apparatus 100. At the time of input of the image data, it is referred to as data of a current frame F0. The data of the current frame F0 is supplied to the frame memory 1, the motion vector detector 2, the motion vector converter 3 and the interpolation frame generator 4.

The frame memory 1 stores two frames of the input image data and outputs data of a first delayed frame F1 which is a frame delayed from the input data of the current frame by one frame and data of a second delayed frame F2 which is a frame delayed from the input data of the current frame by two frames. In the present application, the data of the current frame, the data of the first delayed frame and the data of the second delayed frame are also represented by characters F0, F1 and F2, respectively. Therefore, "data of the current frame F0", "data of the first delayed frame F1", "data of the second delayed frame F2" and "data of the interpolation frame IF" are also represented by "current-frame data F0", "first-delayed-frame data F1", "second-delayed-frame data F2" and "interpolation-frame data IF" respectively.

The first-delayed-frame data F1 output from the frame memory 1 is supplied to the motion vector detector 2, the motion vector converter 3 and the interpolation frame generator 4. Furthermore, the second-delayed-frame data F2 output from the frame memory 1 is supplied to the motion vector detector 2.

The motion vector detector 2 calculates a first motion vector $MV_1$ pointing from the first delayed frame F1 to the current frame F0 (i.e., the first motion vector $MV_1$ indicating a direction and a magnitude of motion of an image from the first delayed frame F1 to the current frame F0) and a second motion vector $MV_2$ pointing from the first delayed frame F1 to the second delayed frame F2 (i.e., the second motion vector $MV_2$ indicating a direction and a magnitude of motion of an image from the first delayed frame F1 to the second delayed frame F2) with respect to each block (which is part of each frame and is composed of a plurality of pixels) on the first delayed frame F1 by referring to the current-frame data F0, the first-delayed-frame data F1 and the second-delayed-frame data F2. The first motion vector $MV_1$ and the second motion vector $MV_2$ are supplied to the motion vector converter 3.

The motion vector converter 3 converts the first motion vector $MV_1$ and the second motion vector $MV_2$ into a third motion vector $MV_3$ pointing from the first delayed frame F1 to the interpolation frame IF (i.e., the third motion vector $MV_3$ indicating a direction and a magnitude of motion of an image from the first delayed frame F1 to the interpolation frame IF) and a fourth motion vector $MV_4$ pointing from the current frame F0 to the interpolation frame IF (i.e., the fourth motion vector $MV_4$ indicating a direction and a magnitude of motion of an image from the current frame F0 to the interpolation frame IF). The third motion vector $MV_3$ and the fourth motion vector $MV_4$ are supplied to the interpolation frame generator 4.

The interpolation frame generator 4 generates the interpolation-frame data IF to be placed between the current frame F0 and the first delayed frame F1, from the first-delayed-frame data F1, the current-frame data F0, the third motion vector $MV_3$ and the fourth motion vector $MV_4$, and then generates the image data DO by inserting the interpolation-frame data IF between the current-frame data F0 and the first-delayed-frame data F1. The image data DO is supplied to the image display unit 5. The image display unit 5 displays an image based on the image data DO.

《2》 Motion Vector Detector 2

Next, the motion vector detector 2 will be described in detail. As shown in FIG. 1, the motion vector detector 2 includes a current frame block extractor 10, a first delayed frame block extractor 11, a second delayed frame block extractor 12, a test interpolator 6, an interpolation data evaluator 7 and a motion vector determiner 8. However, the configuration of the motion vector detector 2 is not limited to the example illustrated in this drawing.

Each of the current frame block extractor 10, the first delayed frame block extractor 11 and the second delayed frame block extractor 12 extracts a block or blocks, each of which is part of each frame, and outputs block data which is a set of data of pixels (pixel values) in the block. For example, each block is composed of a rectangular area having X pixels in a lateral direction (a horizontal direction) and Y pixels in a longitudinal direction (a vertical direction), that is, the rectangular area having X pixels in the lateral direction and Y lines in the longitudinal direction. In other words, the block extracted from the current frame F0, the block extracted from the first delayed frame F1 and the block extracted from the second delayed frame F2 have the same lateral size (number of pixels) and the same longitudinal size (number of pixels i.e., number of lines).

The current frame block extractor 10 extracts blocks, each of which is an area having X pixels in the lateral direction and Y lines in the longitudinal direction, from the current frame F0. The first delayed frame block extractor 11 extracts blocks, each of which is an area having X pixels in the lateral direction and Y lines in the longitudinal direction, from the first delayed frame F1. The second delayed frame block extractor 12 extracts blocks, each of which is an area having X pixels in the lateral direction and Y lines in the longitudinal direction, from the second delayed frame F2.

Figure 2:
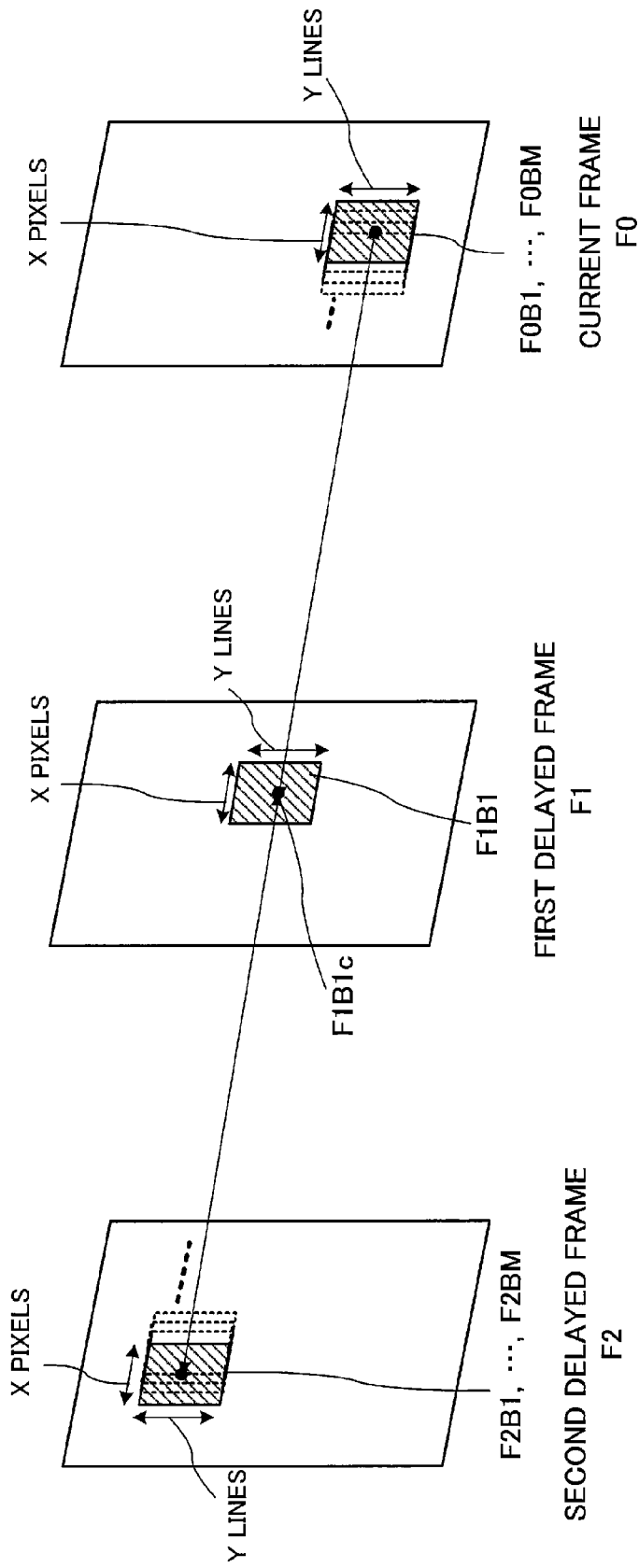
FIG. 2 is a diagram illustrating blocks extracted from frames in the image processing apparatus according to the embodiment.
Figure 3:
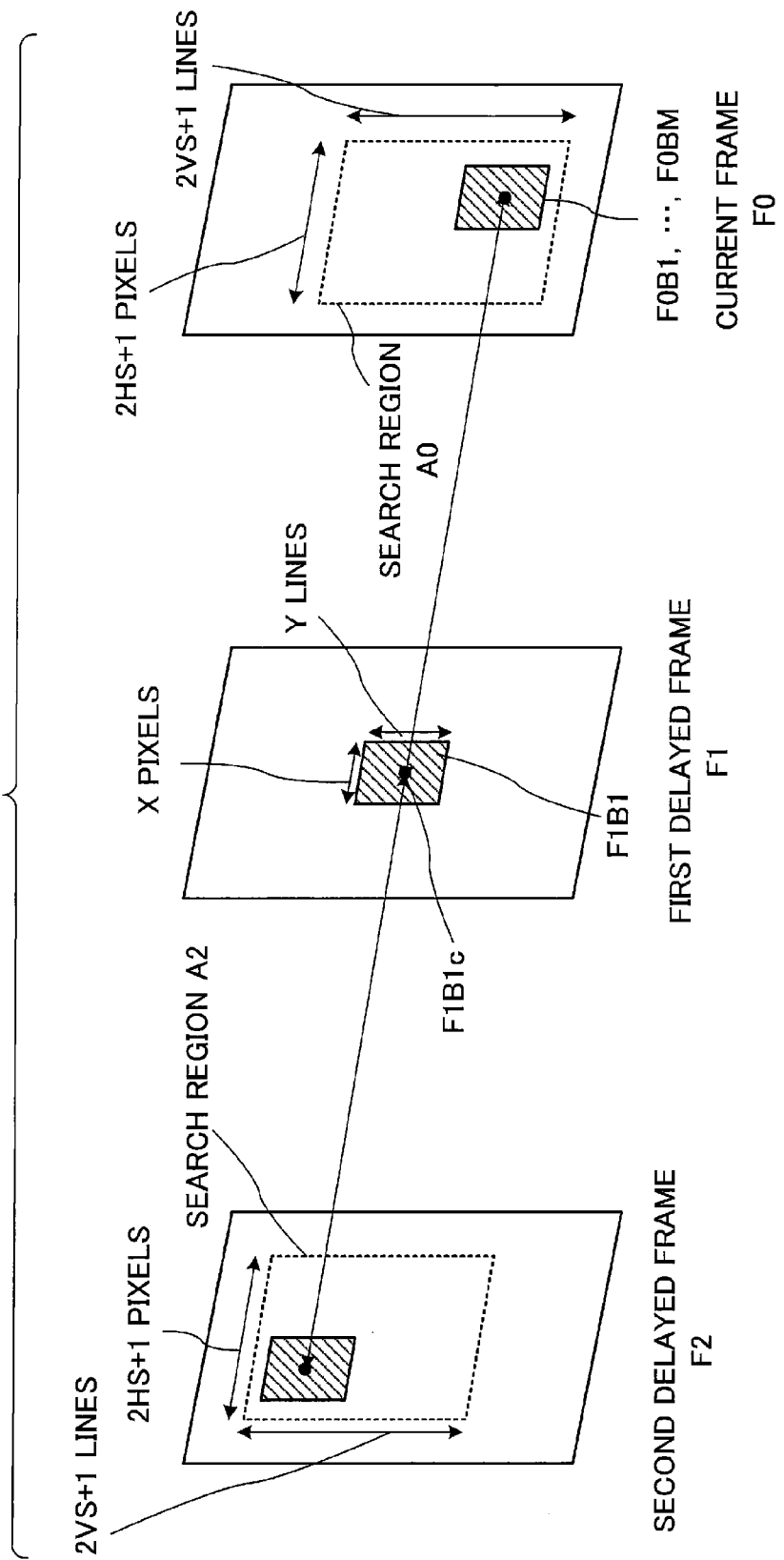
FIG. 3 is a diagram illustrating search regions in the image processing apparatus according to the embodiment.
Figure 4:
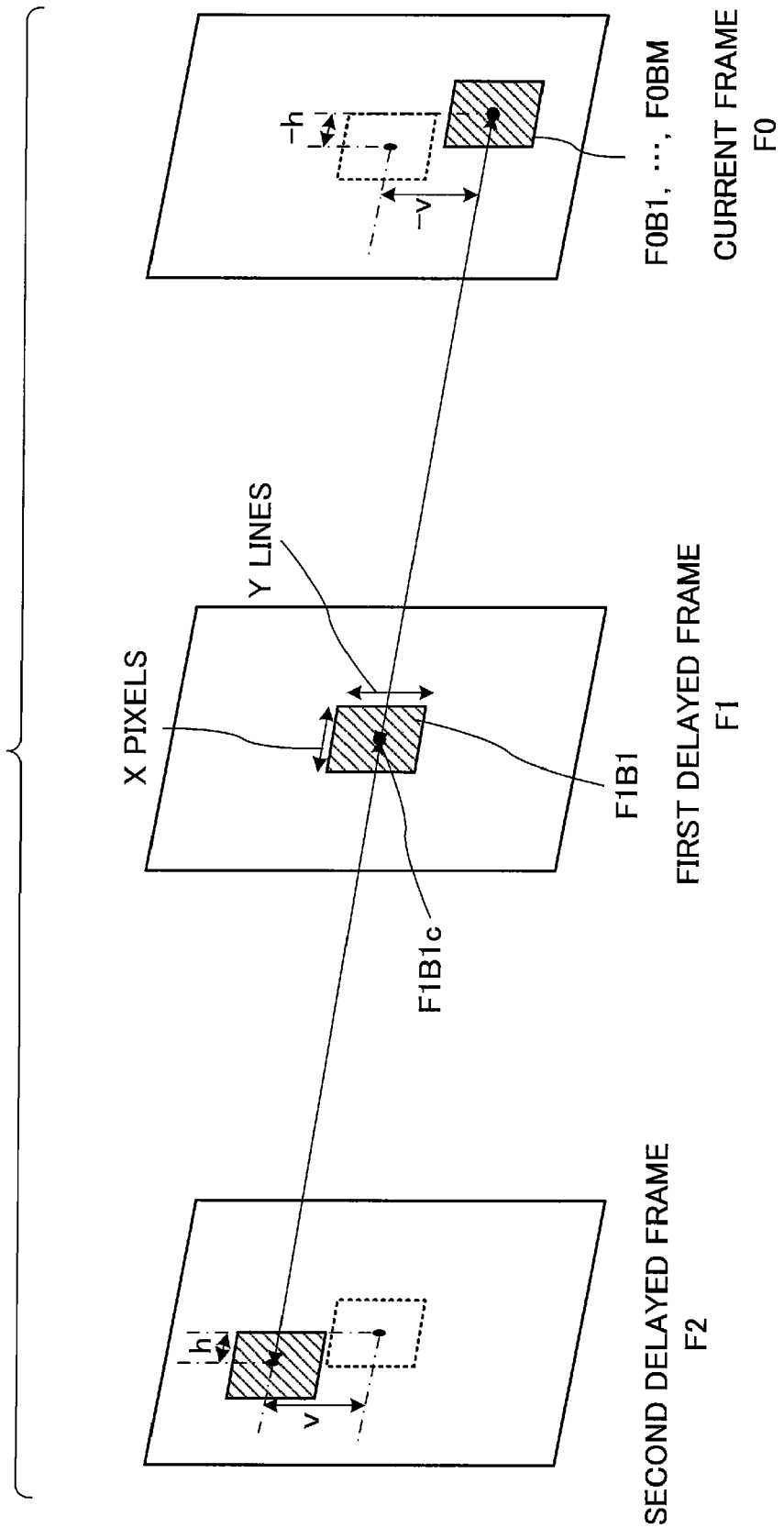
FIG. 4 is a diagram illustrating positions of blocks extracted from the frames in the image processing apparatus according to the embodiment.

Next, a description will be made as to processing for generating one block in the interpolation frame IF using interpolation. FIG. 2 is a diagram illustrating blocks extracted from frames in the image processing apparatus 100, FIG. 3 is a diagram illustrating search regions in the image processing apparatus 100, and FIG. 4 is a diagram illustrating positions of the blocks extracted from the frames in the image processing apparatus 100. As shown in FIG. 2, a single block in the first delayed frame F1 corresponding to a block to be interpolated in the interpolation frame IF, a plurality of blocks in the current frame F0 and a plurality of blocks in the second delayed frame F2 are extracted in order to generate a single block in the interpolation frame IF. The blocks extracted from the current frame F0 and the blocks extracted from the second delayed frame F2 are point-symmetric with reference to the block in the first delayed frame F1 (strictly speaking, a central position of the block in the first delayed frame F1, i.e., a central position F1B1c of the block F1B1 in FIG. 2), and the point-symmetric blocks are treated as a pair. In other words, the current frame block extractor 10 and the second delayed frame block extractor 12 extract a plurality of block pairs, each having a block (one block) in the current frame F0 and a block (the other block) in the second delayed frame F2, which are point-symmetric with reference to the block in the first delayed frame F1. To be more specific, since a block F0B1 (strictly speaking, its central position) extracted from the current frame F0 and a block F2B1 (strictly speaking, its central position) extracted from the second delayed frame F2 are point-symmetric with reference to the block F1B1 (strictly speaking, its central position F1B1c) in the first delayed frame F1, and these point-symmetric two blocks are treated as a pair.

The plurality of block pairs extracted from the current frame F0 and the second delayed frame F2 corresponds to candidates of motion vectors to be detected by the motion vector detector 2, and a block in the search region of the motion vector (strictly speaking, a block having a central position in the search region) is illustrated as regions A0 and A2 in FIG. 3, for example. In general, all blocks in the search regions are extracted. For example, when all blocks in the search regions having ±HS pixels (i.e., 2HS+1 pixels) in the lateral direction (the horizontal direction) and ±VS pixels or lines (i.e.,2VS+1 pixels or lines) in the longitudinal direction (the vertical direction) are extracted and a central position of the block in the first delayed frame F1 is treated as a center, a plurality of blocks, number of which is obtained by ((2HS+1)×(2VS+1)), is extracted from each of the second delayed frame F2 and the current frame F0.

In general, all blocks in the search regions are extracted, but the motion vector detector 2 may adopt other configurations so that only some of the blocks in the search regions are extracted. If the evaluation for all blocks in the search regions is not necessary, or if a range of directions of the motion can be predicted in advance or by using other information, the motion vector detector 2 may adopt different configurations so that only blocks within the predicted range in the search regions are extracted. Moreover, the motion vector detector 2 may adopt other configurations so that some blocks in the search regions are extracted while the other blocks in the search regions are not extracted (i.e., while the other blocks in the search regions are thinned out), e.g., every two pixels in the horizontal direction and every two pixels in the vertical direction are extracted.

In the above description, number of the blocks extracted from the current frame F0 and number of the blocks extracted from the second delayed frame F2 are "M" with reference to a single block in the first delayed frame F1. M blocks extracted from the current frame F0 are represented by first to M-th blocks F0B1, . . . , F0BM, and M blocks extracted from the second delayed frame F2 are represented by first to M-th blocks F2B1, . . . , F2BM. Moreover, each block data are also represented by the same characters (e.g., F0B1, . . . , F0BM and so on) as those representing each block. Therefore, "block data in the current frame F0", "block data in the first delayed frame F1", "block data in the second delayed frame F2" and "block data in the interpolation frame" are also represented by "current-frame block data F0B1, . . . , F0BM", "first-delayed-frame block data F1B1", "second-delayed-frame block data F2B1, . . . , F2BM" and "interpolation-frame block data IFB1" respectively.

The m-th block F2Bm in the second delayed frame F2 and the m-th block F0Bm in the current frame F0 are point-symmetric with reference to the block F1B1 in the first delayed frame F1, where a positive integer m satisfies that m=1, . . . , M. To be more precise, a pixel at a center of the m-th block F2Bm in the second delayed frame F2 and another pixel at a center of the m-th block F0Bm in the current frame F0 are point-symmetric with reference to a reference pixel at a center of the block F1B1 in the first delayed frame F1. For this reason, as illustrated in FIG. 4, if a deviation in the lateral direction of the block F2Bm in the second delayed frame F2 with reference to the block F1B1 in the first delayed frame F1 is represented by "h", where $-HS \leq h \leq HS$ is satisfied, and a deviation in the longitudinal direction of the block F2Bm is represented by "v", where $-VS \leq v \leq VS$ is satisfied, a deviation in the lateral direction of the m-th block F0Bm in the current frame F0 with reference to the block F1B1 in the first delayed frame F1 is represented by "−h" and another deviation in the longitudinal direction of the m-th block F0Bm in the current frame F0 with reference to the block F1B1 in the first delayed frame F1 is represented by "−v".

The current frame block extractor 10 extracts a plurality of (the first to M-th) blocks in the current frame F0, and outputs the first to M-th block data (current-frame block data) F0B1, . . . , F0BM. The first delayed frame block extractor 11 extracts a block F1B1 in the first delayed frame F1. The block F1B1 corresponds to a block to be interpolated in the interpolation frame IF. The second delayed frame block extractor 12 extracts a plurality of (the first to M-th) blocks in the second delayed frame F2 and outputs the first to M-th block data (second-delayed-frame block data) F2B1, . . . , F2BM.

The block data F0B1, F0BM in the current frame F0 and the block data F2B1, . . . , F2BM in the second delayed frame F2 are supplied to the test interpolator 6. The test interpolator 6 generates test interpolation data TD on the basis of the data of the block pairs each composed of a block in the second delayed frame F2 and another block in the current frame F0, which are selected from the block data F2B1, . . . , F2BM in the second delayed frame F2 and the block data F0B1, . . . , F0BM in the current frame F0 and are point-symmetric with reference to the block F1B1 in the first delayed frame F1, i.e., a center of the block F1B1. The test interpolator 6 generates a plurality of items of the test interpolation data TD (data TD1, . . . , TDm, . . . , TDM in FIG. 5 to be described later) on the basis of the plurality of block pairs, where m is a positive integer not larger than M. This test interpolation is performed on the assumption that a central position used for point symmetry is unknown, i.e., the data of the block F1B1 in the first frame F1 is unknown. For this reason, the more accurate the interpolation processing becomes, the higher a correlation (i.e., a correlation value) of the test interpolation data TD with reference to the block data F1B1 in the first delayed frame F1 becomes. Furthermore, the test interpolator 6 outputs the test interpolation data TD (data TDM+1, . . . , TDM+m, . . . , TD2M and data TD2M+1, . . . , TD2M+m, . . . , TD3M in FIG. 5 to be described later), which are the input block data in the current frame F0 and the input block data in the second delayed frame F2, just as they are.

The interpolation data evaluator 7 evaluates a plurality of items of test interpolation data TD (data TD1, . . . , TD3M in FIG. 5 to be described later) by referring to the block data F1B1 in the first delayed frame F1, and supplies a plurality of items of evaluation data ED (data ED1, . . . , ED3M in FIG. 5 to be described later) to the motion vector determiner 8. In this evaluation, the correlation between the test interpolation data TD (data TD1, . . . , TD3M in FIG. 5 to be described later) and the block data F1D1 in the first delayed frame F1 are calculated, and the higher the correlation of the test interpolation data becomes, the higher the evaluation value provided as the evaluation data ED becomes.

The motion vector determiner 8 generates the first motion vector $MV_1$ and the second motion vector $MV_2$ on the basis of the evaluation data ED.

Figure 5:
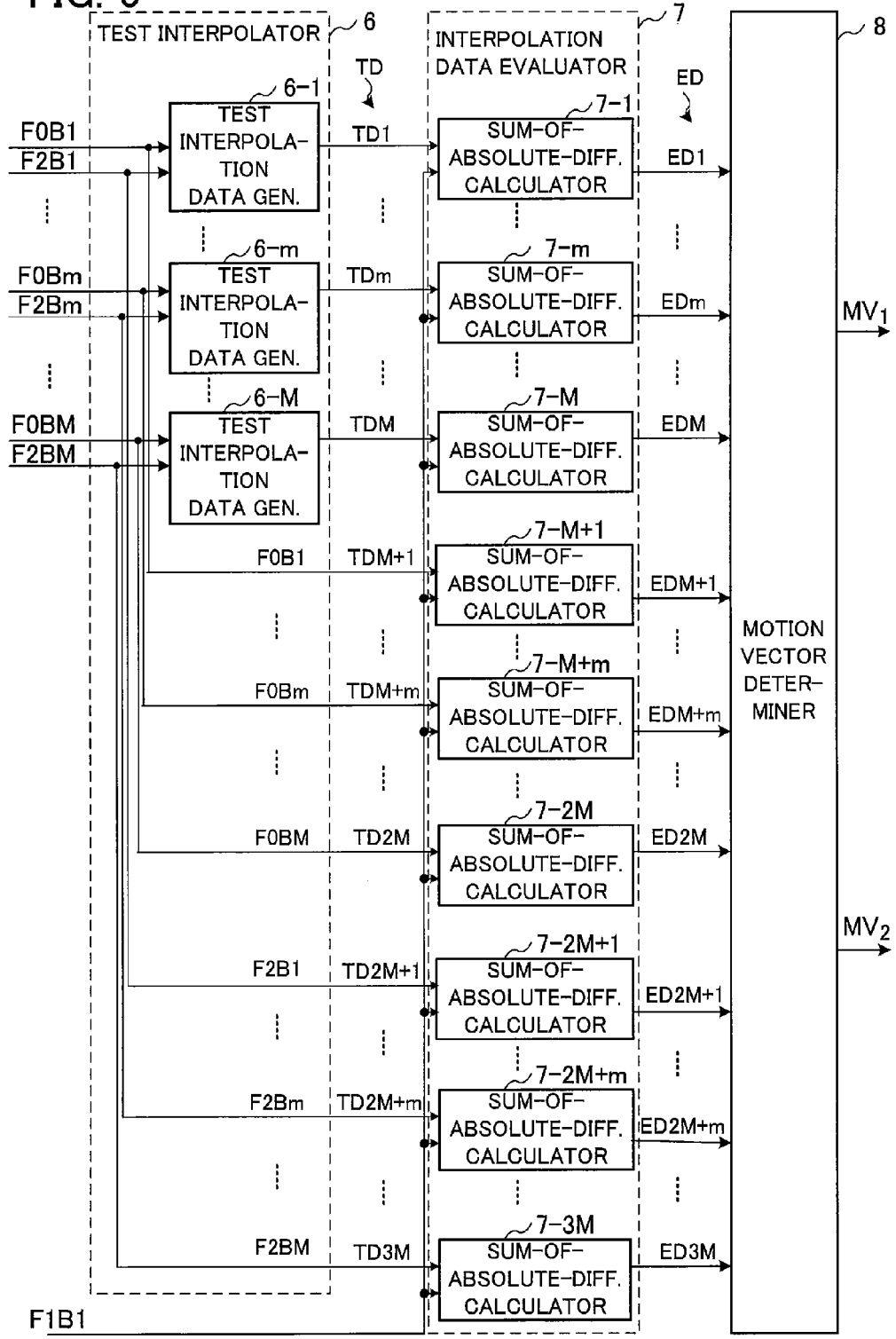
FIG. 5 is a block diagram schematically showing an example of configurations of a test interpolator, an interpolation data evaluator and a motion vector determiner in a motion vector detector of FIG. 1.

Next, with reference to FIG. 5, a concrete example of the motion vector detector 2 will be described in more detail. FIG. 5 is a block diagram illustrating an example of configurations of the test interpolator 6, the interpolation data evaluator 7 and the motion vector determiner 8 in the motion vector detector 2 of FIG. 1. As illustrated in FIG. 5, the test interpolator 6 includes a plurality of (i.e., the first to M-th) test interpolation data generators 6-1, . . . , 6-M, and the interpolation data evaluator 7 includes a plurality of (i.e., the first to 3M-th) sum-of-absolute-difference calculators 7-1, . . . , 7-3M., where M is a positive integer not smaller than two.

The test interpolation data generators 6-1, . . . , 6-M calculates the test interpolation data TD1, . . . , TDM, each of which is obtained by averaging each pair of data F0B1, . . . , F0BM of the blocks in the current frame F0 and corresponding data F2B1, . . . , F2BM of the blocks in the second delayed frame F2 on a pixel-by-pixel basis.

Furthermore, the test interpolator 6 outputs the data F0B1, . . . , F0BM of the blocks in the current frame F0 as the test interpolation data TDM+1, . . . , TD2M and outputs the data F2B1, . . . , F2BM of the blocks in the second delayed frame F2 as the test interpolation data TD2M+1, . . . , TD3M. A set of the test interpolation data TD1, . . . , TD3M is represented by a character TD.

Next, a more detail description will be made. The first block data F0B1 in the current frame F0 and the first block data F2B1 in the second delayed frame F2 are supplied to the test interpolation data generator 6-1.

The test interpolation data generator 6-1 supplies the first test interpolation data TD1 which is an average value for each pixel of the first block data F0B1 in the current frame F0 and the first block data F2B1 in the second delayed frame F2, to the sum-of-absolute-difference calculator 7-1. The average value for each pixel means an average value of a pixel value of each pixel in the block of the current frame F0 and a pixel value of a pixel at corresponding position in the block of the second delayed frame F2 (i.e., pixel values of pixels indicated by the same coordinate position in coordinate systems, each of which has the origin in a reference position of each block such as an upper left corner).

In a similar manner, the second block data F0B2 in the current frame F0 and the second block data F2B2 in the second delayed frame F2 are supplied to the test interpolation data generator 6-2. The test interpolation data generator 6-2 supplies the second test interpolation data TD2 which is an average of each pixel of the second block data F0B2 in the current frame F0 and the second block data F2B2 in the second delayed frame F2, to the sum-of-absolute-difference calculator 7-2.

In a similar manner, the test interpolation data generators 6-3, 6-M generate the third test interpolation data TD3 to the M-th test interpolation data TDM on the basis of the third block data F0B3 to the M-th block data F0BM in the current frame F0 and the third block data F2B3 to the M-th block data F2BM in the second delayed frame F2, and supply them to the sum-of-absolute-difference calculators 7-3, . . . , 7-M.

In a generalized manner, the test interpolator 6 (test interpolation data generator 6-*m*) generates the m-th test interpolation data TDm on the basis of the m-th block data F0Bm (m=1, . . . , M) in the current frame F0 and the m-th block data F2Bm in the second delayed frame F2 and supplies the generated one to the sum-of-absolute-difference calculator 7-*m*. Furthermore, the test interpolator 6 supplies the data F0Bm in the m-th block of the current frame F0 as the test interpolation data TDM+m, to the sum-of absolute-difference calculator 7-M+m. Moreover, the test interpolator 6 supplies the data F2Bm in the m-th block of the second delayed frame F2 as the test interpolation data TD2M+m, to the sum-of-absolute-difference calculator 7-2M+m.

The block data F1B1 in the first delayed frame F1 is supplied to the sum-of-absolute-difference calculators 7-1, . . . , 7-3M in the interpolation data evaluator 7.

The sum-of-absolute-difference calculators 7-1, . . . , 7-3M calculate sums of absolute differences of the test interpolation data TD1, TD3M supplied from the test interpolation data generator 6 and the block data F1B1 in the first delayed frame F1, and output the evaluation data ED1, . . . , ED3M based on the values obtained by the calculation.

The sum-of-absolute-difference calculator 7-1 calculates the sum of absolute differences (i.e., a sum total of the absolute values of the differences) SAD between the data of each pixel in the first test interpolation data TD1 and the data of each pixel of the block data F1B1 in the first delayed frame F1, and supplies the sum of absolute differences as the evaluation data ED1 to the motion vector determiner 8. The sum of absolute differences SAD is calculated by the following equation (1), for example.

$$SAD = \sum_{y=0}^{Y-1} \sum_{x=0}^{X-1} |BK_1(x, y) - BK_2(x, y)| \quad (1)$$

In equation (1), X denotes number of pixels in the block in the lateral direction, and Y denotes number of pixels (i.e., the number of lines) in the block in the longitudinal direction. Furthermore, in equation (1), a smaller value of the sum of absolute differences SAD means a higher correlation. When the sum of absolute differences SAD is used as the evaluation data, a smaller value of the sum of absolute differences SAD means a higher evaluation value.

Furthermore, when $BK_1(x, y)$ and $BK_2(x, y)$ represents data of each pixel in the block, $BK_1(x, y)$ represents data of each pixel forming the test interpolation data TD1 and $BK_2(x, y)$ represents data of each pixel in the block F1B1, SAD in equation (1) means the sum of absolute differences between the data of each pixel in the first test interpolation data TD1 and the data of each pixel in the block F1B1 in the first delayed frame F1. The sum of absolute differences SAD is output as the evaluation data ED1 from the sum-of-absolute-difference calculator 7-1.

Likewise, the sum-of-absolute-difference calculators 7-2, 7-M calculate the sums of absolute differences between the second to M-th test interpolation data TD2 to TDM and the block data F1B1 in the first delayed frame F1, and the sums of absolute differences are output as the evaluation data ED2, . . . , EDM from the motion vector determiner 8.

Further, the sum-of-absolute-difference calculators 7-M+1, . . . , 7-2M calculate the sums of absolute differences between the (M+1)-th to 2M-th test interpolation data TDM+1 to TD2M and the block data F1B1 in the first delayed frame F1, and the sums of absolute differences are output as the evaluation data EDM+1, . . . , ED2M from the motion vector determiner 8.

Furthermore, the sum-of-absolute-difference calculators 7-2M+1, . . . , 7-3M calculate the sums of absolute differences between the (2M+1)-th to 3M-th test interpolation data TD2M+1 to TD3M and the block data F1B1 in the first delayed frame F1, and the sums of absolute differences are output as the evaluation data EDM+1, . . . , ED2M from the motion vector determiner 8, and the evaluation data ED2M+1, . . . , ED3M are output from the motion vector determiner 8.

The motion vector determiner 8 outputs a positional difference of the block in the second delayed frame F2 corresponding to the evaluation data with the highest evaluation value (i.e., the smallest sum of the absolute differences) among the evaluation data ED1, . . . , ED3M, with reference to the block in the first delayed frame F1, that is, a relative position of the block in the second delayed frame F2 with reference to the block in the first delayed frame F1 as the first motion vector $MV_1$. The motion vector determiner 8 also outputs a relative position of the block in the current frame F0 with reference to the first delayed frame F1 as the second motion vector $MV_2$. Since there is no block corresponding to the evaluation data EDM+1, . . . , ED2M in the second delayed frame F2, the motion vector determiner 8 outputs a signal indicating "no corresponding block" as the first motion vector $MV_1$. Likewise, since there is no block corresponding to the evaluation data ED2M+1, . . . , ED3M in the current frame F0, the motion vector determiner 8 outputs a signal indicating "no corresponding block" as the second motion vector $MV_2$.

FIG. 6 is an explanatory diagram illustrating operation of the motion vector detector 2 of FIG. 1. A description will be made as to a case where m=1 is satisfied. An area which is part of the first delayed frame F1 is extracted as the block data F1B1 in the first delayed frame F1.

An area corresponding to a position which is obtained by shifting the block data F1B1 in the first delayed frame F1 by a vector $-V_1$ is set and extracted as the first block data F2B1 in the second delayed frame F2. An area corresponding to a position which is obtained by shifting the block data F1B1 in the first delayed frame F1 by a vector $+V_1$ is set and extracted as the first block data F0B1 in the current frame F0.

The test interpolation data generator 6-1 calculates an average of the first block data F0B1 in the current frame F0 and the first block data F2B1 in the second delayed frame F2 on a pixel-by-pixel basis, thereby generating the test interpolation data TD1. Furthermore, the test interpolation data generator 6-1 outputs the first block data F0B1 in the current frame F0 as the test interpolation data TD2 and outputs the first block data F2B1 in the second delayed frame F2 as the test interpolation data TD3.

The sum-of-absolute-difference calculator 7-1 calculates the sum of absolute differences SAD from the test interpolation data TD1 and the block data F1B1 in the first delayed frame F1 using equation (1) and outputs the sum of absolute differences SAD as the evaluation data ED1.

Similarly, the sum-of-absolute-difference calculator 7-2 calculates the sum of absolute differences SAD from the test interpolation data TD2 and the block data F1B1 in the first delayed frame F1 using equation (1), and outputs the sum of absolute differences SAD as the evaluation data ED2. Similarly, the sum-of-absolute-difference calculator 7-3 also calculates the sum of absolute differences SAD from the test interpolation data TD3 and the block data F1B1 in the first delayed frame F1 using equation (1), and outputs the sum of absolute differences SAD as the evaluation data ED3.

The motion vector determiner 8 outputs a positional difference of the block in the second delayed frame F2 corresponding to the evaluation data with the highest evaluation value (i.e., the smallest sum of the absolute differences) among the evaluation data ED1, ED3M, with reference to the block in the first delayed frame F1, that is, a relative position of the block in the second delayed frame F2 with reference to the block in the first delayed frame F1 as the first motion vector $MV_1$. The motion vector determiner 8 also outputs a relative position of the block in the current frame F0 with reference to the first delayed frame F1 as the second motion vector $MV_2$.

For example, if the evaluation data ED1 has the lowest value, the motion vector determiner 8 outputs a vector $V_1$ as the first motion vector $MV_1$ and outputs a vector $-V_1$ as the second motion vector $MV_2$. Further, if the evaluation data ED2 has the lowest value, the motion vector determiner 8 outputs a signal indicating "no corresponding block" as the first motion vector $MV_1$ and outputs a vector $-V_1$ as the second motion vector $MV_2$. Furthermore, if the evaluation data ED3 has the lowest value, the motion vector determiner 8 outputs the vector $V_1$ as the first motion vector $MV_1$ and outputs a signal indicating "no corresponding block" as the second motion vector $MV_2$.

In the following description, a case where the evaluation data ED3 has the lowest value will be described. Although the case where the first motion vector $MV_1$ is determined from two vectors has been described in FIG. 6, two or more vectors may be set as candidates of the first motion vector $MV_1$ in the embodiment of the present invention. For example, test interpolation may be performed for all blocks within the search region in the second delayed frame F2 which correspond to a predetermined amount of movement of the block F1B1 in the first delayed frame F1 and the blocks in the current frame F0 which are point-symmetric with reference to the blocks within the search region in the second delayed frame F2.

Since the motion vector detector 2 determines the motion vector by evaluating candidates of vectors using data of the first delayed frame F1 which are existent data as has been described, a motion vector pointing from the current frame F0 to the first delayed frame F1 can be calculated with high precision. Furthermore, even if an object appears and/or disappears during a period from the second delayed frame to the current frame, the motion vector can be calculated with high precision.

Furthermore, although the case where the interpolation data evaluator 7 calculates the evaluation data using the sums of absolute differences has been described above, another functional equation such as a sum of squared error equation or the like may be used for calculating the correlation, for example.

Moreover, in order to attach more importance or less importance to both of the second delayed frame and the current frame, the motion vector determiner 8 may calculate the minimum value after assigning weight to only the evaluation data ED1, . . . , EDm, for example.

⟨3⟩ Motion Vector Converter 3 and Interpolation Frame Generator 4

Figure 7A:
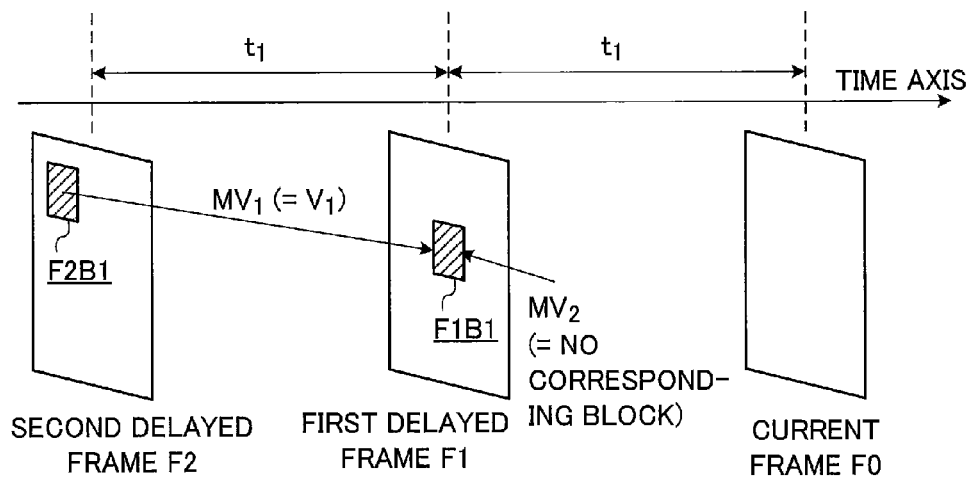
FIGS. 7A and 7B are explanatory diagrams illustrating operation of a motion vector converter and an interpolation frame generator of FIG. 1.
Figure 7B:
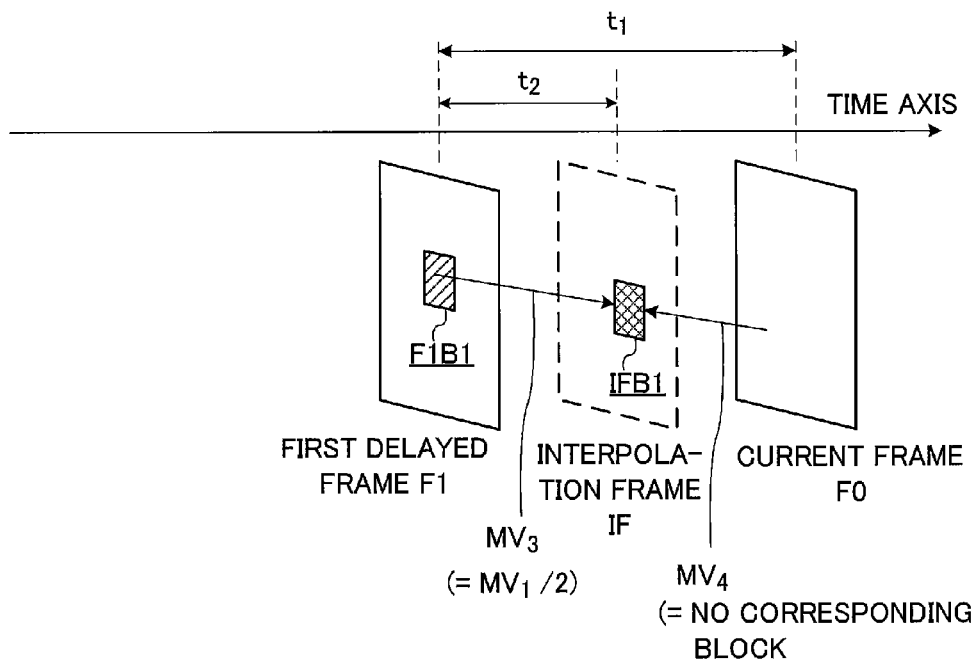

Next, operation of the motion vector converter 3 and the interpolation frame generator 4 will be described in detail with reference to FIGS. 7A and 7B. FIGS. 7A and 7B are explanatory diagrams illustrating operation of the motion vector converter 3 and the interpolation frame generator 4 of FIG. 1.

The motion vector converter 3 converts the first motion vector $MV_1$ pointing from the first delayed frame F1 to the current frame F0 and the second motion vector $MV_2$ into the third motion vector $MV_3$ pointing from the first delayed frame F1 to the interpolation frame IF and the fourth motion vector $MV_4$ pointing from the current frame F0 to the interpolation frame IF.

As illustrated in FIGS. 7A and 7B, when a time interval between input frames is represented by $t_1$ and a time interval between the first delayed frame F1 and the interpolation frame is represented by $t_2$, the motion vectors $MV_3$ and $MV_4$ are calculated using equations (2) and (3). For example, when an input image signal of 60 Hz is converted into an image signal of 120 Hz, the time interval $t_1$ is 1/60 seconds and the time interval $t_2$ is 1/120 seconds.

$$MV_3 = MV_1 \times t_2/t_1 \quad (2)$$

$$MV_4 = MV_2 \times (t_1-t_2)/t_1 \quad (3)$$

Furthermore, if the motion vector $MV_1$ is a signal indicating "no corresponding block" (e.g., a signal having a predetermined signal level), a signal indicating "no corresponding block" is output as the motion vector $MV_3$, and if the motion vector $MV_2$ is a signal indicating "no corresponding block", a signal indicating "no corresponding block" is output as the motion vector $MV_4$.

After the third and fourth vectors $MV_3$ and $MV_4$ are obtained as described above, as illustrated in FIGS. 7A and 7B, the interpolation-frame data IF is calculated from an average value of the data (data of the block F1B1) in the first delayed frame F1 which is data of a position indicated by the vector $-MV_3$ pointing from the interpolation frame IF and the data (data of the block F0B1) in the current frame F0 which is data of a position indicated by the vector $-MV_4$ pointing from the interpolation frame IF. The interpolation-frame data IF including the generated data is interpolated between the data of the first delayed frame F1 and the data of the current frame F0, and these frames are output. At this time, the block data F1B1 in the first delayed frame F1 and the block data F0B1 in the current frame F0 which are used for interpolation are point-symmetric with each other with reference to a position of the data obtained by interpolating the interpolation frame IF.

⟨4⟩ Operation of Motion Vector Detector 2

FIG. 8 is an explanatory diagram illustrating an example of a correspondence of the second-delayed-frame data F2, the first-delayed-frame data F1 and the current-frame data F0, which are supplied to the motion vector detector 2 of FIG. 1. A description will be made as to operation of the embodiment when a signal representing pictures as shown in FIG. 8 is input. In the pictures shown in FIG. 8, a hatched circle on a foreground moves from an upper left toward a lower right on the screen with the passage of time, and therefore alphabets ("A" to "J") which are displayed on a background and do not move (i.e., static) disappear and/or appear.

Figure 9A:
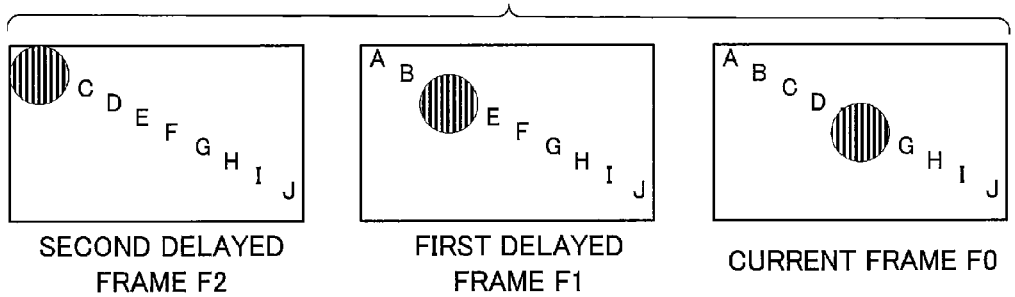
FIGS. 9A-9D are explanatory diagrams illustrating an example of operation of the motion vector detector of FIG. 1.
Figure 9B:
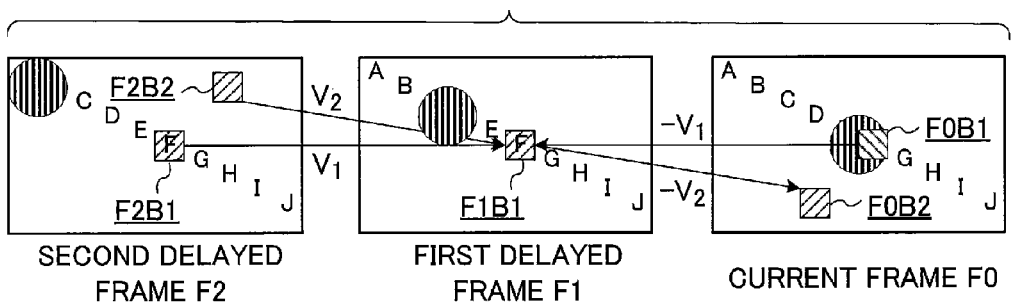
Figure 9C:
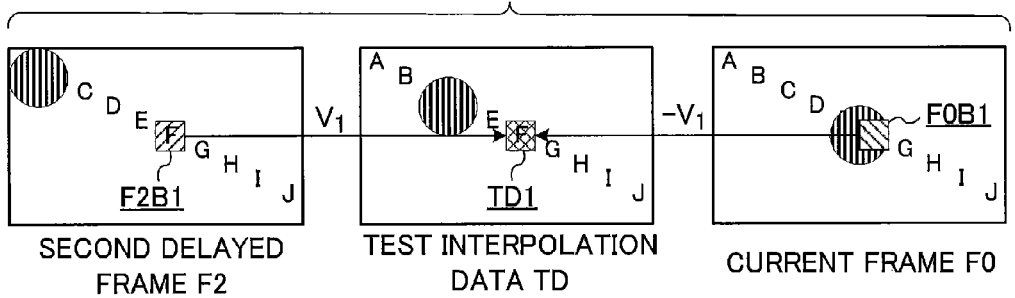
Figure 9D:
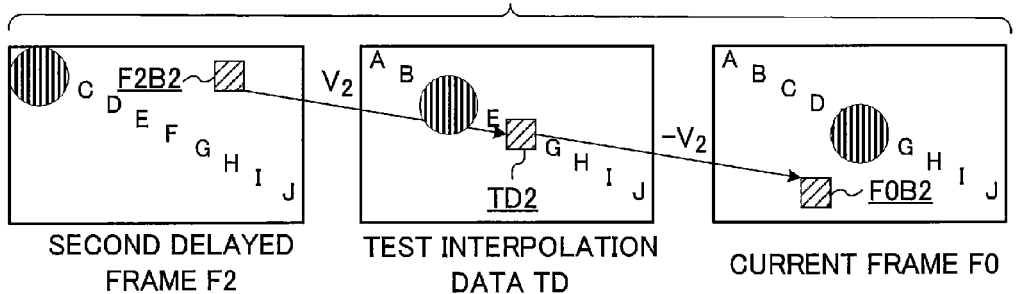

FIGS. 9A-9D are explanatory diagrams illustrating an example of operation of the motion vector detector 2 of FIG. 1, and FIGS. 10A-10D are explanatory diagrams illustrating an example of operation subsequent to FIG. 9D of the motion vector detector 2 of FIG. 1. FIG. 9A illustrates a specific example of the image data supplied to the motion vector detector 2, and FIGS. 9B-9D and FIGS. 10A-10D illustratesh operation of the test interpolator 6 and the interpolation data evaluator 7.

A description will be made as to operation of the motion vector detector 2, to which the second-delayed-frame data F2, the first-delayed-frame data F1 and the current-frame data F0 illustrated in FIG. 9A are input. The test interpolator 6 generates the test interpolation data for each motion vector. As illustrated in FIG. 9B, the test interpolator 6 sets the block data F1B1 in the first delayed frame F1 from a certain region in the first delayed frame F1, sets the block data F2B1 in the second delayed frame F2 which is placed at position by shifting the block data F1B1 in the first delayed frame F1 from the block data F1B1 in the first delayed frame F1 by a vector $-V_1$, and sets the block data F0B1 which is placed at position by shifting the block data in the current frame F0 from the block data F1B1 in the first delayed frame F1 by a vector $V_1$.

Furthermore, the test interpolator 6 regards the block data in the second delayed frame F2 existing at a position obtained by shifting the block data F1B1 in the first delayed frame F1 by a vector $-V_2$ as the block data F2B2, and regards the block data in the current frame F0 existing at a position obtained by shifting the block data F1B1 in the first delayed frame F1 by a vector $V_2$ as the block data F0B2.

As illustrated in FIG. 9C, the test interpolator 6 calculates an average value for each pixel from the block data F2B1 and the block data F0B1, and generates an average value of each pixel as the test interpolation data TD1. Likewise, as illustrated in FIG. 9D, the test interpolator 6 generates an average value of each pixel from the block data F2B2 and the block data F0B2.

Figure 10A:
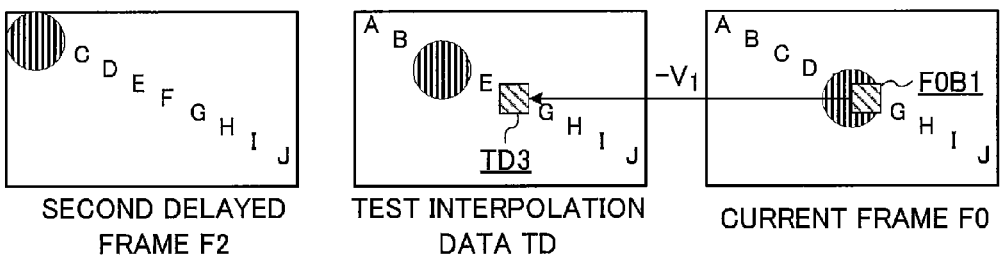
FIGS. 10A-10D are explanatory diagrams illustrating an example of operation subsequent to that of FIG. 9D of the motion vector detector of FIG. 1.
Figure 10B:
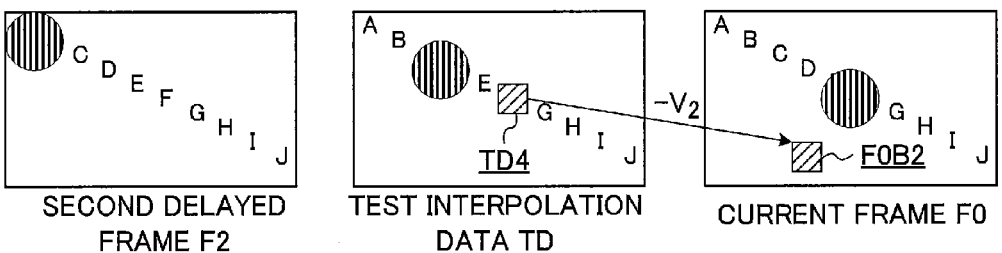
Figure 10C:
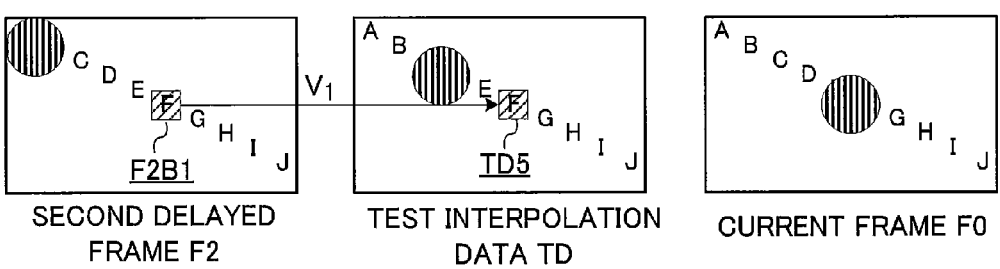
Figure 10D:
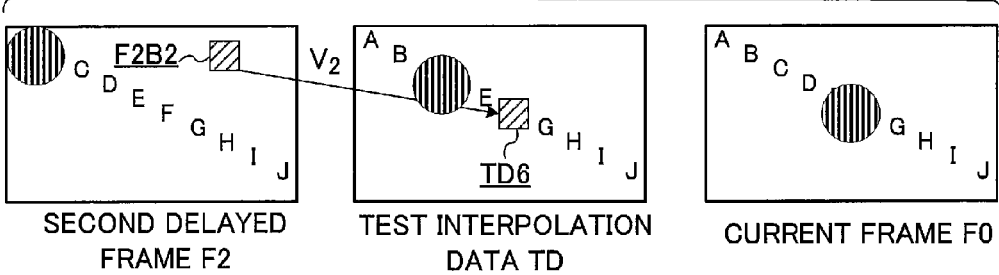

Likewise, as illustrated in FIG. 10A, the test interpolator 6 outputs the block data F0B1 as the test interpolation data TD3. Likewise, as illustrated in FIG. 10B, the test interpolator 6 outputs the block data F0B2 as the test interpolation data TD4. Likewise, as illustrated in FIG. 10C, the test interpolator 6 outputs the block data F2B1 as the test interpolation data TD5. Likewise, as illustrated in FIG. 10D, the test interpolator 6 outputs the block data F2B2 as the test interpolation data TD6.

The interpolation data evaluator 7 calculates the sums of absolute differences between each of the test interpolation data TD1, . . . , TD6 illustrated in FIGS. 9C and 9D and FIGS. 10A-10D and the block data F1B1 and outputs the evaluation data ED1, . . . , ED6. In the specific example illustrated in FIGS. 9A-9D and FIGS. 10A-10D, an image represented by the test interpolation data TD5 indicates a letter "F", the sum of absolute differences with reference to the block F1B1 is the lowest. For this reason, the evaluation data ED5 is data, the sum of absolute differences of which is the lowest.

The motion vector determiner 8 outputs a vector $V_1$ which is the motion vector $MV_1$ corresponding to the evaluation data ED5, a value of which is the smallest in the values of the evaluation data ED1, . . . , ED6, and outputs a signal indicating "no corresponding block" which is the vector $MV_2$.

The embodiment can be modified so that the first motion vector $MV_1$ for all areas in the first delayed frame F1 is generated by setting the blocks without lacks (i.e., without left spaces) and calculating the motion vectors for these blocks. In other words, the embodiment can be modified so that the first motion vector $MV_1$ and the second motion vector $MV_2$ for each block are generated by dividing the first delayed frame F1 into a plurality of blocks each having the same size and performing the above described processing for each of the plurality of blocks, and the third motion vector $MV_3$ and the fourth motion vector $MV_4$ are generated by performing conversion of the blocks in the interpolation frame disposed at a position corresponding to a position of each of the third and fourth motion vectors $MV_3$ and $MV_4$.

Furthermore, the embodiment can be modified so that the above processing is performed for the blocks, each center of which is each pixel in the first delayed frame F1, thereby generating the first motion vector $MV_1$ and the second motion vector $MV_2$ for each pixel, and the conversion processing using the first motion vector $MV_1$ and the second motion vector $MV_2$ for a pixel in the interpolation frame IF positioned at a position corresponding to a position of pixel in the first delayed frame F1, thereby obtaining the third and fourth motion vectors $MV_3$ and $MV_4$.

(5) Operation of Motion Vector Converter 3

Figure 11A:
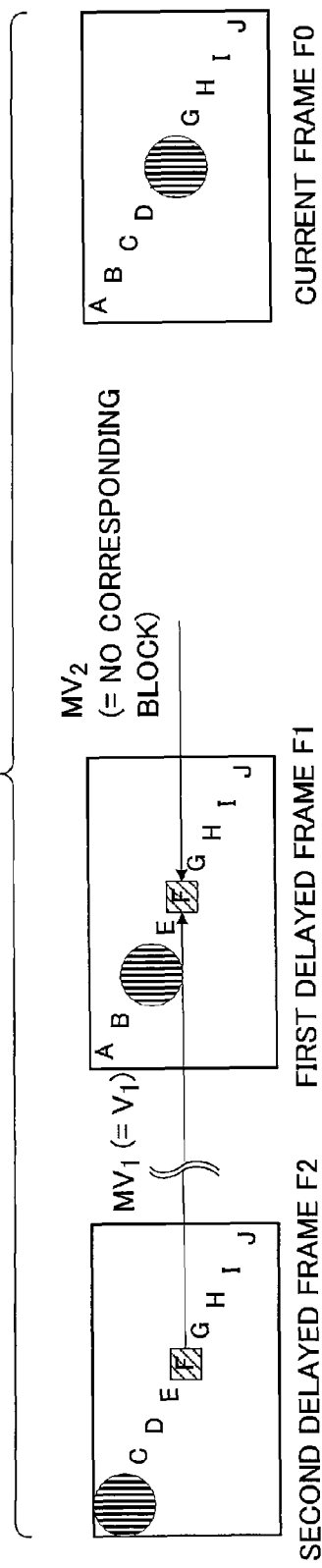
FIGS. 11A and 11B are explanatory diagrams illustrating an example of operation of the motion vector converter of FIG. 1.
Figure 11B:
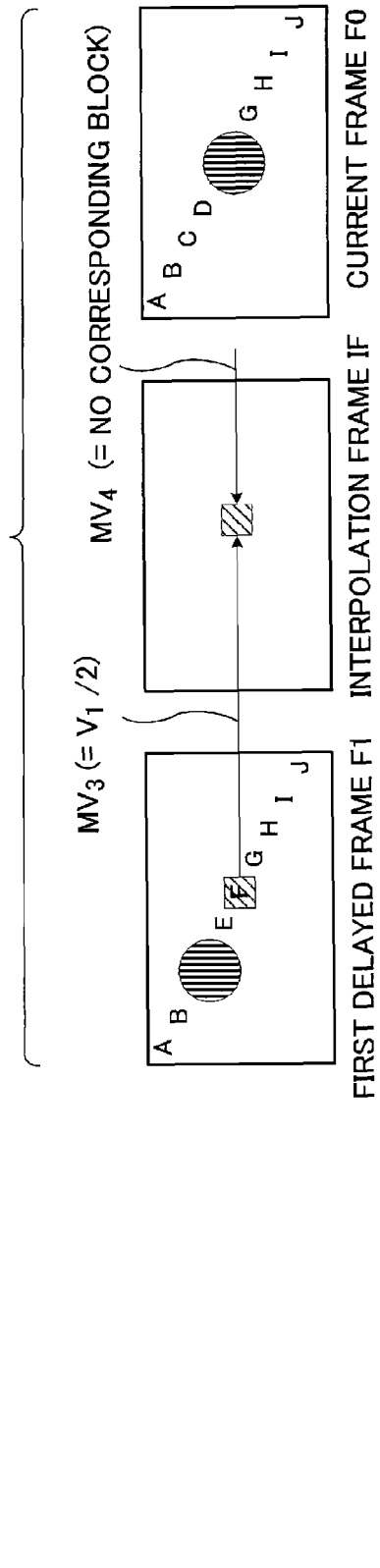

FIGS. 11A and 11B are diagrams illustrating an example of operation of the motion vector converter 3 of FIG. 1. FIG. 11A illustrates an example of an input to the motion vector converter 3, and FIG. 11B illustrates an example of an output from the motion vector converter 3 when the motion vector converter 3 receives the inputs. When receiving the inputs of FIG. 11A, the motion vector converter 3 converts the motion vector $MV_1$ pointing from the first delayed frame F1 to the current frame F0 and the motion vector $MV_2$ shown in FIG. 11A into the third motion vector $MV_3$ pointing from the first delayed frame F1 to the interpolation frame IF and the fourth motion vector $MV_4$ from the current frame F0 to interpolation frame IF as shown in FIG. 11B, using equations (2) and (3) and $t_2=t_1/2$. In the specific example illustrated in FIGS. 11A and 11B, since the first motion vector $MV_1$ is a vector $V_1$, the second motion vector $MV_2$ is a signal indicating "no corresponding block", $t_1$ is 1/60 seconds and $t_2$ is 1/120 seconds, the third motion vector $MV_3$ is a vector $V_1/2$ and the fourth motion vector $MV_4$ is a signal indicating "no corresponding block" from equations (2) and (3).

(6) Operation of Interpolation Frame Generator 4

FIG. 12 is an explanatory diagram illustrating an example of operation of the interpolation frame generator 4 of FIG. 1. FIG. 12 illustrates a case where the third motion vector $MV_3$ is a signal indicating a vector $V_{1/2}$ and the fourth motion vector $MV_4$ is a signal indicating "No Corresponding block" as shown in FIGS. 11A and 11B. As shown in FIG. 12, the interpolation frame generator 4 calculates interpolation-frame data IF which is first-delayed-frame data F1 of a position obtained by shifting the interpolation frame IF by a vector $-MV_3$. The interpolation frame generator 4 generates image data DO by interpolating the generated interpolation frame IF between the first delayed frame F1 and current frame F0, and output the image data DO to the image display unit 5.

As has been described above, in the embodiment, a motion vector can be detected with high precision by evaluating the motion vector and the interpolation frame can be interpolated between the frames without image disturbance. Furthermore, even if an object disappears and/or appears before and after the interpolation frame, the interpolation frame can be interpolated between the frames without image disturbance.

(7) Image Processing Method and Image Display Method

FIG. 13 is a flowchart showing the image processing method and the image display method according to the embodiment of the present invention. FIG. 13 illustrates processing steps of the image processing apparatus 100 and the image display apparatus 101 according to the embodiment. As shown in FIG. 13, in the motion vector detection step ST1, the image processing apparatus 100 refers to the current-frame data F0, the first-delayed-frame data F1 which is a frame delayed by one frame with reference to the current frame F0, and the second-delayed-frame data F2 which is a frame delayed by two frames with reference to the current frame F0, thereby generating the first motion vector $MV_1$ pointing from the second delayed frame F2 to the first delayed frame F1 and the second motion vector $MV_2$ pointing from the current frame F0 to the first delayed frame F1. This processing corresponds to the processing of the motion vector detector 2 shown in FIG. 1.

In the subsequent motion vector conversion step ST2, the image processing apparatus 100 converts the first motion vector $MV_1$ and the second motion vector $MV_2$ into the third motion vector $MV_3$ pointing from the first delayed frame F1 to the interpolation frame IF (which is inserted between the current frame F0 and the first delayed frame F1) and the fourth motion vector $MV_4$ pointing from the current frame F0 to the interpolation frame IF. This processing corresponds to the processing of the motion vector converter 3 shown in FIG. 1.

In the subsequent interpolation frame generation step ST3, the image processing apparatus 100 generates data of an interpolation frame IF from the first-delayed-frame data F1, the current-frame data F0, the third motion vector $MV_3$, and the fourth motion vector $MV_4$, and generates image data DO in which the generated interpolation-frame data IF is inserted between the current-frame data F0 and the first-delayed-frame data F1. This processing corresponds to the processing of the interpolation frame generator 4 shown in FIG. 1.

The image processing method and the image display method illustrated in FIG. 13 can be implemented by software installed in the image processing apparatus 100 or the image display apparatus 101 according to the embodiment.

(8) Effects of the Embodiment

As has been described above, according to the image processing apparatus 100, the image processing method, the image display apparatus 101 and the image display method of the present embodiment, since the motion vector with high precision can be calculated by evaluating the motion vector pointing from the preceding frame to the central frame and the motion frame pointing from the subsequent frame to the central frame while the central frame among the successive three frames is regarded as the most reliable one, the interpolation frame can be interpolated without image disturbance. For this reason, according to the present embodiment, a high quality displayed image can be implemented with little image blur and judder by inserting the appropriate interpolation frame IF. Furthermore, according to the present embodiment, even if an object disappears and/or appears before and after the interpolation frame, the interpolation frame can be interpolated without image disturbance.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An image processing apparatus, in which an interpolation frame is inserted between a current frame of an image and a first delayed frame preceding the current frame by one frame, the apparatus comprising:
a motion vector detector referring to current-frame block data forming part of the current frame and second-delayed-frame block data forming part of a second delayed frame preceding the current frame by two frames, thereby calculating a first motion vector pointing from the second delayed frame to the first delayed frame, the motion vector detector referring to the current-frame block data and first-delayed-frame block data forming part of the first delayed frame preceding the current frame by one frame, thereby calculating a second motion vector pointing from the current frame to the first delayed frame;

a motion vector converter converting the first motion vector into a third motion vector pointing from the first delayed frame to the interpolation frame, the motion vector converter converting the second motion vector into a fourth motion vector pointing from the current frame to the interpolation frame; and an interpolation frame generator generating data of the interpolation frame from the third motion vector, the fourth motion vector, data of the first delayed frame and data of the current frame, thereby outputting image data in which the data of the interpolation frame is inserted between the data of the current frame and the data of the first delayed frame; wherein the motion vector detector includes a test interpolator outputting a plurality of items of test interpolation data which includes first test interpolation data generated using an average value of both block data of the second-delayed-frame block data and the current-frame block data, second test interpolation data generated by placing the current-frame block data at a position corresponding to a position of the first-delayed-frame block data, and third test interpolation data generated by placing the second-delayed-frame block data at a position corresponding to the position of the first-delayed-frame block data, an interpolation data evaluator evaluating a correlation of each of the test interpolation data with reference to the first-delayed-frame block data, thereby outputting a plurality of items of evaluation data indicating results of the evaluating, and a motion vector determiner outputting a motion vector of an item of the evaluation data having highest correlation in the plurality of items of the evaluation data; and the first test interpolation data, the second test interpolation data and the third test interpolation data are obtained as the plurality of items of the test interpolation data from a plurality of items of the second-delayed-frame block data and a plurality of items of the current-frame block data.

2. The image processing apparatus according to claim 1, wherein the test interpolator generates and outputs the first test interpolation data using the average value of both of the second-delayed-frame block data of a block composed of a plurality of pixels in the second delayed frame and the current-frame block data of another block composed of a plurality of pixels in the current frame, which are point-symmetric with reference to a block composed of a plurality of pixels in the first delayed frame, outputs the second test interpolation data by placing the current-frame block data at a position corresponding to a position of the block of the first delayed frame, wherein the block composed of the plurality of pixels in the second delayed frame and the another block composed of the plurality of pixels in the current frame are point-symmetric with reference to the block composed of the plurality of pixels in the first delayed frame, and outputs the third test interpolation data by placing the second-delayed-frame block data at a position corresponding to a position of the block of the first delayed frame, wherein the block composed of the plurality of pixels in the second delayed frame and the another block composed of the plurality of pixels in the current frame are point-symmetric with reference to the block composed of the plurality of pixels in the first delayed frame.

3. The image processing apparatus according to claim 2, wherein the test interpolator includes a plurality of test interpolation data generators for calculating the first test interpolation data from block data obtained by averaging the current-frame block data and the second-delayed-frame block data on a pixel-by-pixel basis.

4. The image processing apparatus according to claim 1, wherein the interpolation data evaluator calculates a plurality of correlations between the plurality of items of the test interpolation data supplied from the test interpolator and block data of a block positioned at a center of a point-symmetric relationship of the second delayed frame and the current frame, thereby generating the plurality of items of the evaluation data on the basis of the plurality of items of the test interpolation data.

5. The image processing apparatus according to claim 1, wherein the interpolation data evaluator calculates a sum of absolute differences, which is a sum of absolute values of differences between the plurality of items of the test interpolation data supplied from the test interpolator and block data of a block positioned at a center of a point-symmetric relationship of the second delayed frame and the current frame.

6. The image processing apparatus according to claim 5, wherein the interpolation data evaluator includes a plurality of sum-of-absolute-difference calculators each calculating the sum of absolute differences between the test interpolation data and the first-delayed-frame block data.

7. An image display apparatus comprising:
the image processing apparatus of claim 1; and
an image display unit for displaying an image based on the image data supplied from the interpolation frame generator.

8. An image processing method, in which an interpolation frame is inserted between a current frame of an image and a first delayed frame preceding the current frame by one frame, the method comprising:

a motion vector detection step of referring to current-frame block data forming part of the current frame and second-delayed-frame block data forming part of a second delayed frame preceding the current frame by two frames, thereby calculating a first motion vector pointing from the second delayed frame to a first delayed frame, and referring to the current-frame block data and first-delayed-frame block data forming part of the first delayed frame preceding the current frame by one frame, thereby calculating a second motion vector pointing from the current frame to the first delayed frame;

a motion vector conversion step of converting the first motion vector into a third motion vector pointing from the first delayed frame to the interpolation frame, and converting the second motion vector into a fourth motion vector pointing from the current frame to the interpolation frame; and an interpolation frame generation step of generating data of the interpolation frame from the third motion vector, the fourth motion vector, data of the first delayed frame and data of the current frame, thereby outputting image data in which the data of the interpolation frame is inserted between the data of the current frame and the data of the first delayed frame; wherein the motion vector detection step includes a test interpolation step of outputting a plurality of items of test interpolation data which includes first test interpolation data generated using an average value of both block data of the second-delayed-frame block data and the current-frame block data, second test interpolation data generated by placing the current-frame block data at a position corresponding to a position of the first-delayed-frame block data, and third test interpolation data generated by placing the second-delayed-frame block data at a position corresponding to the position of the first-delayed-frame block data, an interpolation data evaluation step of evaluating a correlation of each of the test interpolation data with reference to the first-delayed-frame block data, thereby outputting a plurality of items of evaluation data indicating results of the evaluating, and a motion vector determination step of outputting a motion vector of an item of the evaluation data having highest correlation in the plurality of items of the evaluation data; and the first test interpolation data, the second test interpolation data and the third test interpolation data are obtained as the plurality of items of the test interpolation data from a plurality of items of the second-delayed-frame block data and a plurality of items of the current-frame block data.

9. The image processing method according to claim 8, wherein the test interpolation step includes the steps of:

generating and outputting the first test interpolation data using the average value of both of the second-delayed-frame block data of a block composed of a plurality of pixels in the second delayed frame and the current-frame block data of another block composed of a plurality of pixels in the current frame, which are point-symmetric with reference to the block composed of a plurality of pixels in the first delayed frame, outputting the second test interpolation data by placing the current-frame block data at a position corresponding to a position of the block of the first delayed frame, wherein the block composed of the plurality of pixels in the second delayed frame and the another block composed of the plurality of pixels in the current frame are point-symmetric with reference to the block composed of the plurality of pixels in the first delayed frame, and outputting the third test interpolation data by placing the second-delayed-frame block data at a position corresponding to a position of the block of the first delayed frame, wherein the block composed of the plurality of pixels in the second delayed frame and the another block composed of the plurality of pixels in the current frame are point-symmetric with reference to the block composed of the plurality of pixels in the first delayed frame.

10. The image processing method according to claim 9, wherein the test interpolation step includes a plurality of test interpolation data generation steps for calculating the first test interpolation data from block data obtained by averaging the current-frame block data and the second-delayed-frame block data on a pixel-by-pixel basis.

11. The image processing method according to claim 10, wherein the interpolation data evaluation step includes a step of calculating a plurality of correlations between the plurality of items of the test interpolation data supplied from the test interpolator and block data of a block positioned at a center of a point-symmetric relationship of the second delayed frame and the current frame, thereby generating the plurality of items of the evaluation data on the basis of the plurality of items of the test interpolation data.

12. The image processing method according to claim 8, wherein the interpolation data evaluation step includes a step of calculating a sum of absolute differences, which is a sum of absolute values of differences between the plurality of items of the test interpolation data supplied from the test interpolator and block data of a block positioned at a center of a point-symmetric relationship of the second delayed frame and the current frame.

13. The image processing method according to claim 12, wherein the interpolation data evaluation step includes a plurality of the sum-of-absolute-difference calculation steps, each of which includes a step of calculating the sum of absolute differences between the test interpolation data and the first-delayed-frame block data.

14. An image display method comprising:

the steps in the image processing method of claim 8; and a step of displaying an image based on the image data supplied in the interpolation frame generation step.

\* \* \* \* \*